Patented Aug. 27, 1929.

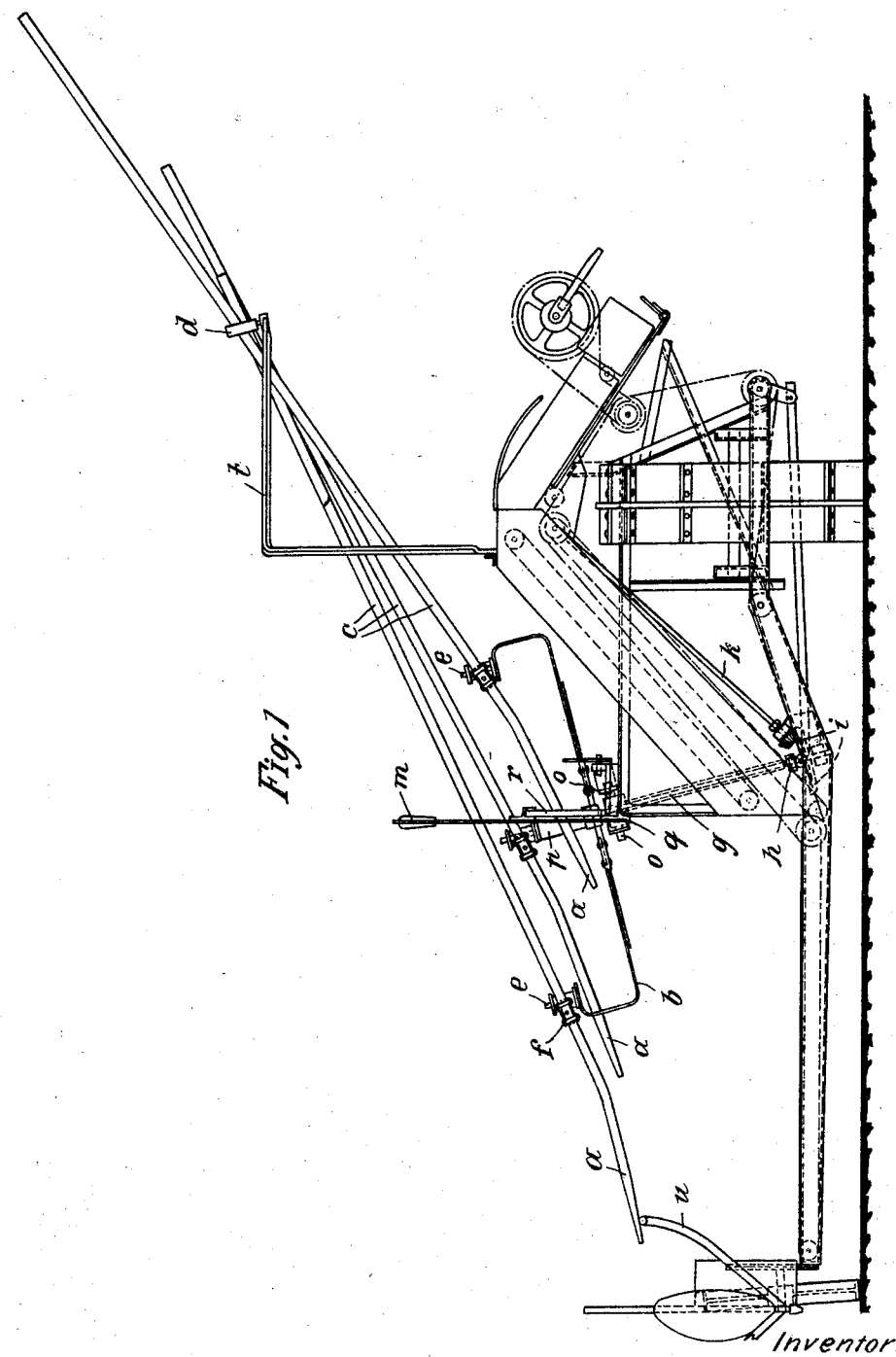

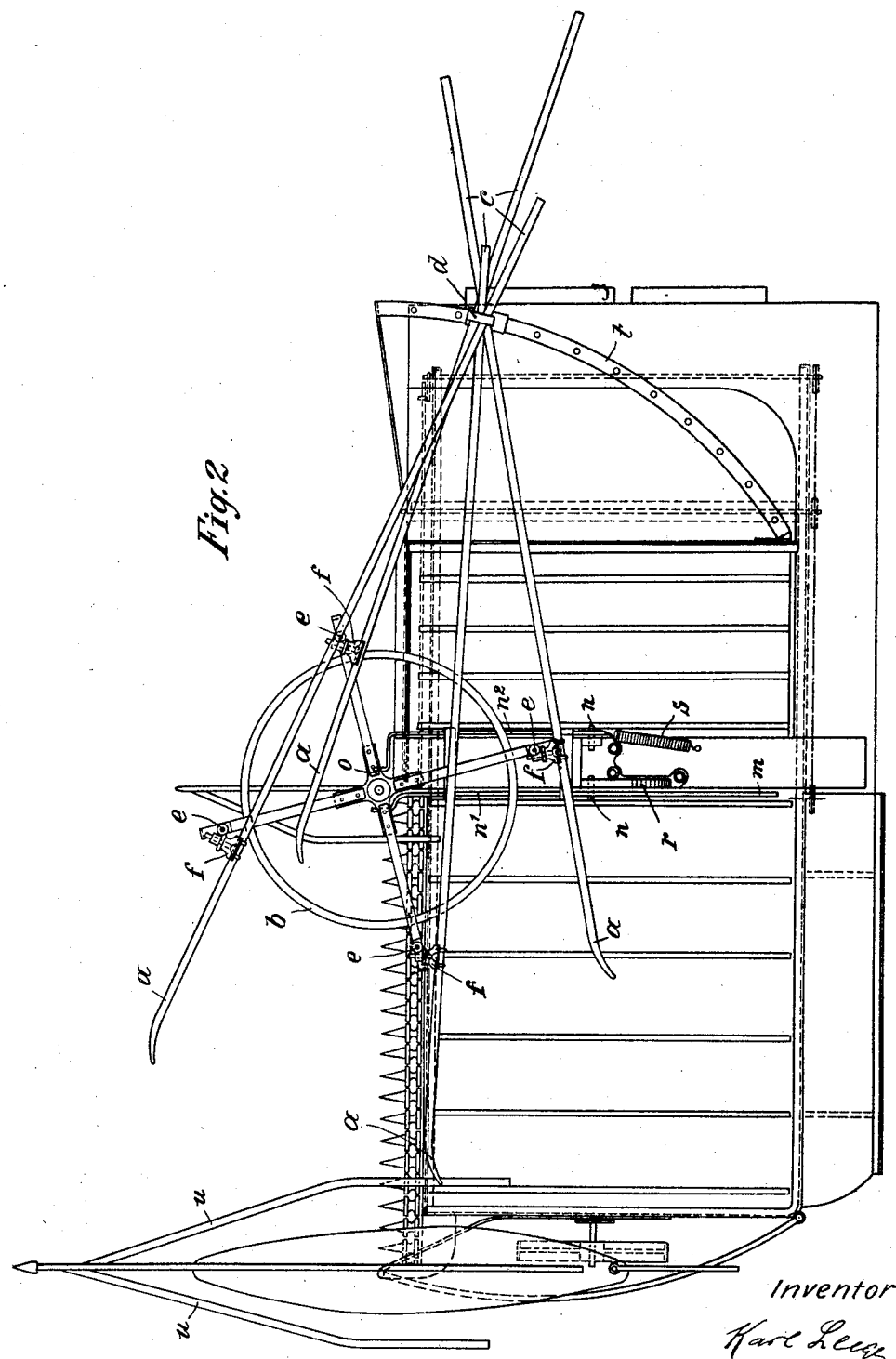

1,725,873

UNITED STATES PATENT OFFICE.

KARL LEEGE, OF COLOGNE, GERMANY.

LAYING-OVER DEVICE FOR REAPING AND BINDING MACHINES.

Application filed October 20, 1927, Serial No. 227,568, and in Germany November 23, 1925.

To lay over the crop in reaping and binding machines there have long been used so called reels consisting of bars rotating in the path of the machine, which bars move down from above parallel which the cutter beam of the machine into the corn to lay it over on to the platform web. With this arrangement, satisfactory operation is only obtained with standing corn. With a laying crop therefore, the reel is removed in order, by providing a second seat, to allow an operator by the aid of a long pole to lay the crop on to the platform by hand and facilitate the separation of the corn at the outer dividing member.

The object of the invention is to effect the work of the second operator mechanically; for this purpose substantially horizontal rotating rods engage the corn from the side in order to lay it on the platform web. The laying over device serves therefore principally for use in reaping laying crops, but can be used with standing crops. In the former case it ensures that no corn becomes attached to the outer dividing member, and interferes with the action of the machine, since the device sweeps over the inner dividing rod, an operating method which was not possible with the reel used hitherto. In the present case by backward adjustment of a guide ring for the rotating rods the laying over device can be used with equally satisfactory results for lifting and pressing close overhanging ears, since as is known, with long corn the stalks standing at the edge of the machine track buckle and are cut off by the reel without reaching the platform web. The present device thus prevents the cutting off and loss of the straws or ears.

A laying over device according to this invention is illustrated in the accompanying drawing in combination with a reaping and binding machine. Figure 1 is an elevation, and Figure 2 a plan.

As can be seen from the drawings, the laying over device with the rotating rods $a$ is arranged to the right, and forwardly in the direction of movement of the machine, over the cutter beam. The rods themselves, in the present case four, are towards one end articulated to a more or less horizontal rotating star wheel $b$, and have their other suitably extended ends $c$ slidably carried in an eye $d$ fixed in position. In this way the angle of engagement of the rods with the corn varies continually during their rotation. The star wheel $b$ carries at the outer ends of its four arms perpendicular pins $e$, for bearing the rod carriers $f$. The rotation of the star wheel is effected by the more or less vertical shaft $g$ arranged beneath, which carries at its lower end a universal joint $h$ and is driven through the bevel wheels $i$ and shaft $k$ from the mechanism of the machine. The star wheel $b$ is adjustable axially of its shaft $g$, that is in height, for which purpose the upper part of the shaft $g$ may for example be of square section. The adjustment of the star wheel on the shaft for the purpose of suiting the device to the height of the corn at any moment is effected from a hand lever $m$ which is pivoted on a fixed spindle $n$. The other arm of this double-ended lever is forked and consists of two bars $n^1$ and $n^2$ which engage at their ends with two external pins $o$ on a ring $q$ arranged below the hub $p$ of the star wheel. This ring does not rotate but simply lifts the star wheel to the correct height under the control of the lever $m$. The lever $m$ has a locking device over a segmented rack $r$. A spring $s$ is provided to balance the load on the lever.

In order to adjust the engaging angle of the rods $a$ to the most suitable value for any particular conditions, the eye $d$ of the rod ends $c$ is adjustable along an arc on a rail $t$, so that the ears on the corn can be correctly directed and pressed in.

At the front end and to the left of the reaping machine is provided the outer ear dividing member. This consists here of two rods $u$ meeting forwardly at an acute angle and extended backwards parallel with one another. The inner rod of this ear dividing member lies beneath the ends of the rotating rods $a$ so that during rotation the dividing member is swept over by them.

Claims.

1. In a reaping and binding machine having a cutter board, a laying over device comprising a plurality of bars arranged over the cutter board and inclined downwards from the stubble side of the machine, a substantially horizontal wheel, equidistant brackets on said wheel to which the bars are pivoted one to each at a distance from the lower ends of the bars, and means for rotating said wheel so as to introduce the lower portions of the bars in succession laterally into the uncut crop and then move the bars backwards over the cutter board.

2. The laying over device claimed in claim 1 in combination with a horizontal segmental rail arranged in an elevated position at the stubble side of the machine substantially concentrically with the axis of the wheel, and a ring adapted to be secured to said segment in different positions, said ring being adapted to form a support wherein the upper ends of the bars are arranged to slide.

3. The laying over device claimed in claim 1 in combination with means for varying the elevation of the wheel.

4. The laying over device claimed in claim 1 in combination with a ring forming a thrust bearing for the wheel, a double-armed-lever engaging said ring at one end and adapted to support it and the wheel in different elevations, and means for securing said lever in its different angular positions.

In testimony whereof I affix my signature.

KARL LEEGE.